(12) United States Patent
Hayata et al.

(10) Patent No.: US 7,036,652 B2
(45) Date of Patent: May 2, 2006

(54) VIBRATION-TYPE PARTS FEEDING METHOD AND DEVICE

(75) Inventors: Yoshimi Hayata, Kawasaki (JP); Shun-ichirou Katsuyama, Nagoya (JP)

(73) Assignee: Dengensha Manufacturing Company Limited, Kanagawa (JP)

( * ) Notice: Subject to any disclaimer, the term of this patent is extended or adjusted under 35 U.S.C. 154(b) by 0 days.

(21) Appl. No.: 10/949,328

(22) Filed: Sep. 27, 2004

(65) Prior Publication Data
US 2005/0067258 A1    Mar. 31, 2005

(30) Foreign Application Priority Data
Sep. 30, 2003   (JP) .............................. 2003-339782

(51) Int. Cl.
*B65G 47/24* (2006.01)

(52) U.S. Cl. ....................... 198/391; 198/396; 198/757

(58) Field of Classification Search ............ 193/25 FT; 198/756–758, 390, 391, 550.3, 396
See application file for complete search history.

(56) References Cited

U.S. PATENT DOCUMENTS

| 3,506,107 | A | * | 4/1970 | Tarzian ........................ 198/391 |
| 4,519,524 | A | * | 5/1985 | Hirose ......................... 198/757 |
| 5,269,401 | A | * | 12/1993 | Ito et al. ................. 193/25 FT |
| 6,257,392 | B1 | * | 7/2001 | Graham ....................... 198/396 |

FOREIGN PATENT DOCUMENTS

JP    62-185613    *   8/1987   ............. 193/25 FT

* cited by examiner

*Primary Examiner*—James R. Bidwell
(74) *Attorney, Agent, or Firm*—Wenderoth, Lind & Ponack, L.L.P.

(57) ABSTRACT

In a vibration type parts feeding method and a vibration type parts feeding device, welding nuts are put on a parts transportation track arranged in an inner wall of a vibration bowl of a parts feeder to be arranged in turn, and normal positioned welding nuts are sorted and transported from a parts discharging outlet at a top end portion of the track to a desired place. A sorting unit for passing only the normal positioned welding nuts is installed detachably adjacent to the parts discharging outlet of the vibration bowl, and thus, it becomes possible to adapt to sorting upward and downward-positioned welding nuts with various kinds of shapes and dimensions.

8 Claims, 8 Drawing Sheets

VIBRATION-TYPE PARTS FEEDING METHOD AND DEVICE

BACKGROUND OF THE INVENTION

The present invention relates to a parts feeder (a vibration-type parts feeder) attached to and employed in a resistance spot welding machine, and further in detail, relates to a parts feeding method and a device for sorting right and wrong positioning of projection nuts that have projections (projections for welding) formed at four corners thereof and other similar small parts (hereinafter, welding nuts).

As shown in FIGS. 13 through 15, up to this time, a generally known nuts feeding method and nuts feeding device have been such that, when welding nuts N having projections for welding P are lined up and fed continuously on a transportation track 31 which stands up spirally from a bottom portion of a vibration bowl 30, it is judged whether each of the welding nuts is upward or downward by the way that the welding nuts go up along the transportation track 31, nuts whose projections are downward (normal positioned parts) and whose projections are upward (abnormal positioned parts) pass on a toothed track 34 for selecting upward or downward nuts, and only the normal positioned parts are transported to a feeder unit (a head for supplying nuts) which is attached to a spot welding machine.

A method for selecting upward parts or downward parts and a corresponding device in the prior art have the toothed track 34, in which several teeth are formed along a direction that the parts move, connected in series to an end portion of the transportation track 31.

In this case, as shown in FIGS. 13 and 14, the normal positioned parts move along guide rails 32, 33 consisting of large and small metal round bars, and are advanced and are transported to a parts transportation opening in a condition that projections P of the welding nuts N are engaged with the teeth when the nuts go over the toothed track 34.

On the other hand, as shown in FIG. 15, because a flat surface 35 at an upper portion of the nut is not engaged with tooth grooves 36 when the projections P are inverse (upward), the nuts fall into the vibration bowl to collect. Then, the nuts go up along the transportation track 31 again.

Although not shown in the figures, nuts selected and arranged normally are transported to a rail extending to an outside of the bowl and are separated individually by a separation device along the way. The separated nuts are supplied to the feeder unit by being blown into a supply hose by compressed air injected from an air nozzle.

The welding nut transported to the feeder unit is stopped in the feeder unit. The stopped nut is held at an end of a spindle by driving the spindle so as to supply the welding nut forwardly from the feeder unit. The welding nut held by the spindle is removed form a stopper position by an advance of the spindle to be supplied to a workpiece positioned on a lower electrode.

The supplied welding nut is gripped with a workpiece set on the lower electrode by pressing movement of an upper electrode and is heated and melted with the workpiece by applying a necessary pressure between the electrodes and sending an electric current for welding to the projection of the nut to be joined together.

In the prior vibration type welding nuts feeding device, various selection means such as a tooth-shaped track and guide rails consisting of large and small metallic round bars have been adopted.

In the above-mentioned prior art documents, a mechanism for selecting upward and downward surfaces of the welding nuts or a vibration type welding nuts feeding device with a function for sorting is published in JP 60-151821 U, JP 62-074617 U, JP 2000-219314 A and JP 2001-072233 A, but they only disclose a changing of sorting unit or adjusting parts of the unit.

Accordingly, problems to be resolved by the present invention are that cost reduction and a date of delivery can not be achieved because a vibration bowl for exclusive use with every size of the welding nuts is necessary when the outside dimension of the welding nuts is changed in the prior vibration type welding nuts feeding system, for instance, from M6 type nuts to M8 type nuts. A standardized product can not be attained because skill and experience are necessary in order to weld the guide rails of the metallic round bars so as to match a track line in the prior device for sorting upward and downward welding nuts.

SUMMARY OF THE INVENTION

The present invention is developed for resolving the above problems. A first invention is to provide a vibration type parts feeding method in which welding nuts with projections are put on a spiral shaped parts transporting track which is provided in a vibration bowl in a parts feeder for sorting the welding nuts to be arranged in turn, and the parts are transported from a parts outlet at a top end portion of the track to a desired portion, characterized in that a sorting unit for sorting upward and downward welding nuts is mounted detachably, and sorting upward and downward welding nuts with different dimensions is made possible by only changing the sorting unit or adjusting parts of the sorting unit.

A second invention is developed to provide a vibration type parts feeding device having a parts feeder for feeding welding nuts on a work panel so that the welding nuts with projections and the work panel are pressed and welded together by upper and lower electrodes of a resistance spot welding machine. The parts feeder comprises a vibration bowl housing a large number of the welding nuts with projections, a parts transportation track arranged spirally along an inside wall of the vibration bowl so as to cause the welding nuts to rise and be transported in series to an upper outlet of the bowl by vibration of the bowl and arranging the welding nuts in turn in the vibration bowl, and a sorting unit for judging normal and abnormal positions of the welding nuts, wherein the sorting unit is mounted detachably and adjacently to the parts outlet of the vibration bowl.

Besides, a third invention is such that a presser plate for sorting the welding nuts and/or a width limitation plate are provided in the sorting unit, and mounting positions of them can be adjusted corresponding to width and height of the welding nuts including projections for welding.

That is to say, a distance between a sorting rail of the presser plate and the width limitation plate can be adjusted by moving the width limitation plate in a width direction of the parts transportation track corresponding to shape dimensions of the welding projections of the welding nuts.

Furthermore, the presser plate can be changed when the distance between the width limitation plate and the sorting rail does not match with the dimension of the feeding parts.

According to the method of the first invention, even when the outside dimension of the welding nut is changed from that of an M6 type to an M8 type whose sizes are different, the vibration bowl for the M6 type can be used as it is by only changing a sorting unit or adjusting the sorting unit. Furthermore, because feeding parts merely go up along the transportation track in the vibration bowl in spite of the dimensions of the parts, a common vibration bowl can be used if the outside dimensions of the welding nuts are changed.

Accordingly, compared with the prior parts sorting methods, though a vibration bowl corresponding to each shape change of sorted parts has previously been needed, standardization of the vibration bowl can be accomplished by the method according to the present invention, so that a processing for welding the sorting rail to the parts track in the transportation track as shown in the prior art, a skill for welding and empirical rule therefor are not necessary. As sorting functions are provided at one place due to unification, a structure of the vibration bowl becomes simple, so that an increase in durability is accomplished and man-hours required for manufacturing can be decreased.

Also, because the device according to the second invention involves changing or adjusting only the sorting unit at the parts outlet portion of the transportation track, without using the tooth-shaped track of in the prior art, connection to the tooth-shaped track or adjustment of the guide rails when the parts transfer to the tooth shape grooves etc. are unnecessary. Accordingly, the sorting ability can be improved in comparison with that of the prior device, manufacturing labor can be saved, and further, it is possible to significantly reduce costs by standardization of the sorting unit and the vibration bowl.

Furthermore, by the device according to the third invention, height or distance of the track is adjusted according to outside dimensions of the sorted parts, so that an increase of the sorting ability can be realized.

Moreover, in the device of the present invention, the distance between the sorting plate and the sorting rail can be easily adjusted by moving the width limitation plate in a plate width direction of the parts track corresponding to shapes or sizes of the nuts or the projections.

Also, because the sorting plate can be changed when a fixing distance between the width limitation plate and the sorting rail does not match with the dimensions of the fed parts, the kinds of sorting units to be prepared may be few since exchanges of sorting units for different parts are reduced to a necessary minimum.

Furthermore, since normal positioned welding nuts sometimes drop from the tooth-shaped track of the prior art due to vibration when the projections are engaged with the tooth grooves, a sorting system using the tooth-shaped track has a reduced sequential sorting ability. Moreover, in order for the welding nuts to be transferred from the parts transportation track to the tooth-shaped track of the prior art under continuous movement, delicate adjustment of two guide rails is necessary, and therefore, the sorting precision is influenced largely by the result of the adjustment.

According to the present invention, because the sorting unit in which the width limitation plate and the presser plate combine with the sorting plate including the rail is constituted in a compact arrangement, the structure of it is simple and the width limitation plate and the presser plate are merely adjusted to correspond to the shape and the dimensions of the welding projections of the welding nuts. As a result, the structure is easy to apply to other vibration bowls as a simple product of the sorting unit.

DETAILED DESCRIPTION OF THE INVENTION

An object of the invention is to effect standardization of a vibration type parts feeding device which can be adapted for use with different welding nuts by changing or adjusting only a sorting unit at a portion of a parts transportation track of a vibration bowl even if outside dimensions of the welding nuts are changed.

Figure 1:
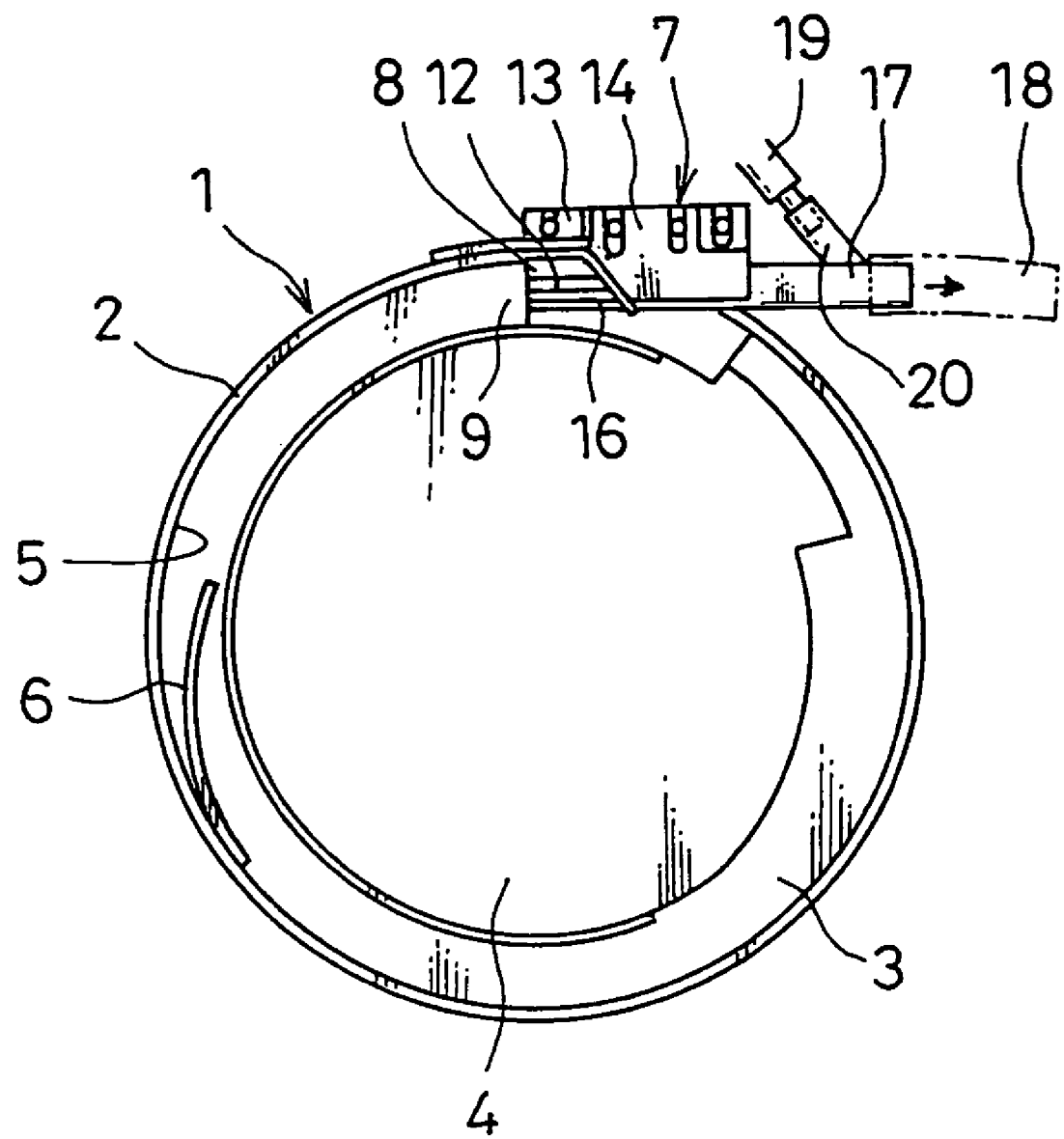
FIG. 1 is a schematic plan view illustrating an embodiment of a vibration type welding nuts feeding device for use in a method of the present invention.
Figure 2:
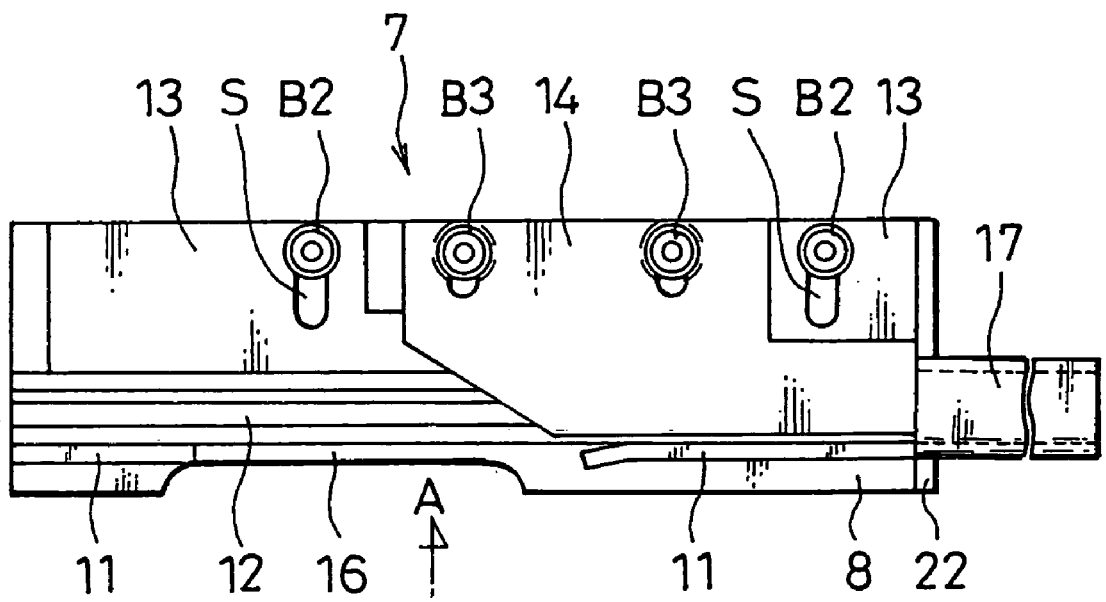
FIG. 2 is a plan view illustrating an embodiment of a sorting unit for sorting upward and downward welding nuts, according to the present invention.
Figure 3:
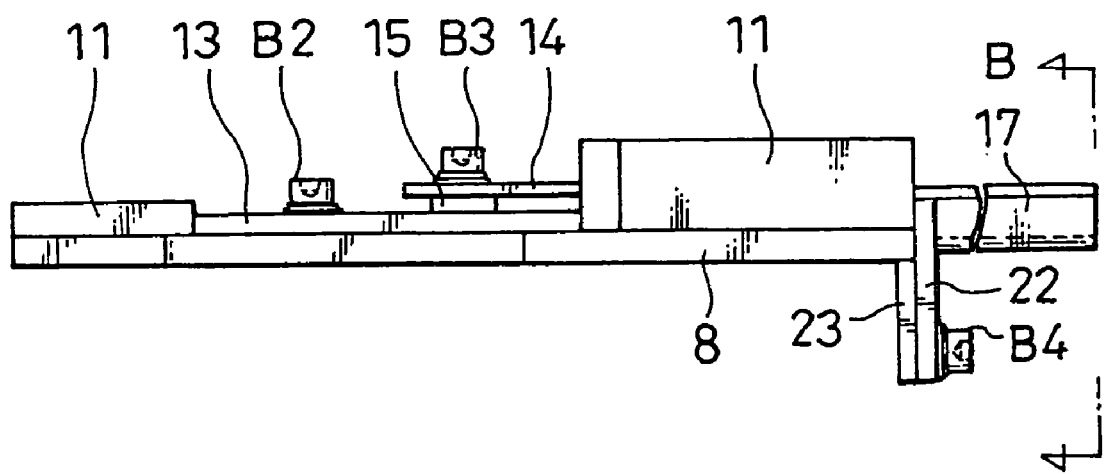
FIG. 3 is a view taken in a direction of an arrow A in the embodiment of the sorting unit of the present invention.
Figure 4:
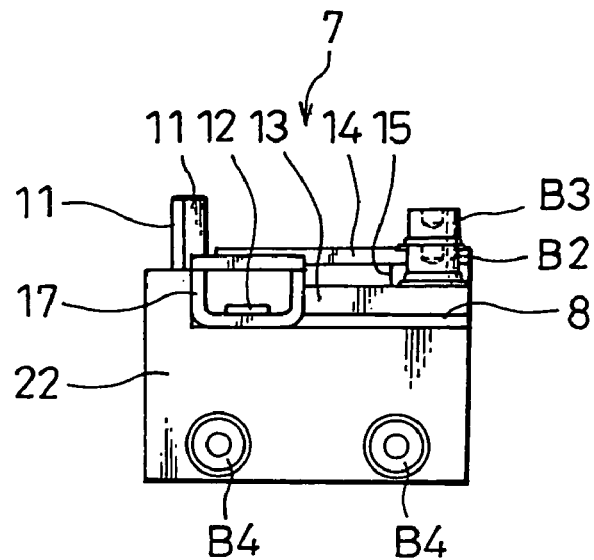
FIG. 4 is a view taken in a direction of arrows B in the embodiment of the sorting unit of the present invention.
Figure 5:
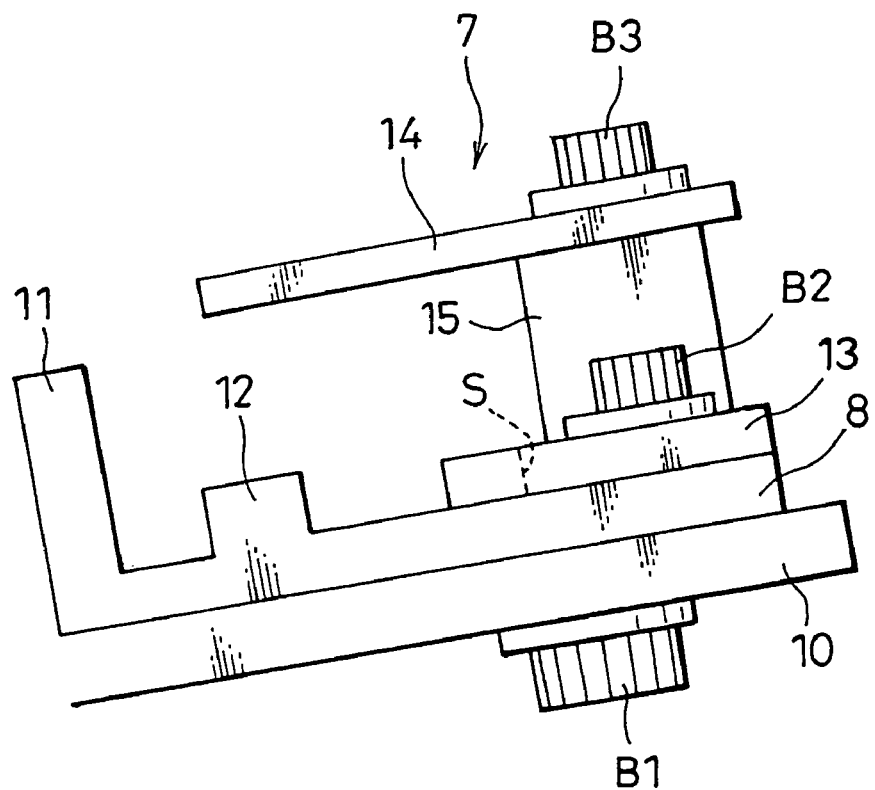
FIG. 5 is a schematic cross sectional view illustrating attaching a bowl main body, a structure of assembling unit parts and a parts track.

FIG. 1 is a plan view illustrating a typical example of a case that the present invention embodied with a transportation track installed on a vibration bowl for feeding welding nuts. FIG. 2 is a plan view showing a sorting unit of the present invention in detail. FIG. 3 is a view taken in a direction of an arrow A in FIG. 2. FIG. 4 is a view taken in a direction of arrows B in FIG. 3. FIG. 5 is a schematic cross sectional view illustrating attaching a bowl main body, a structure of assembling unit parts and a parts track.

A vibration type parts feeder 1 is for sorting welding nuts N. As shown in FIG. 1, a vibration bowl 2 is for housing the welding nuts N. The welding nuts N housed in the vibration bowl 2 are gradually moved up along a bowl wall 5 from a separation bottom 4 of the vibration bowl 2 by vibration, and are arranged on a spiral-shaped parts transportation track 3 and transported outside.

Figure 12:
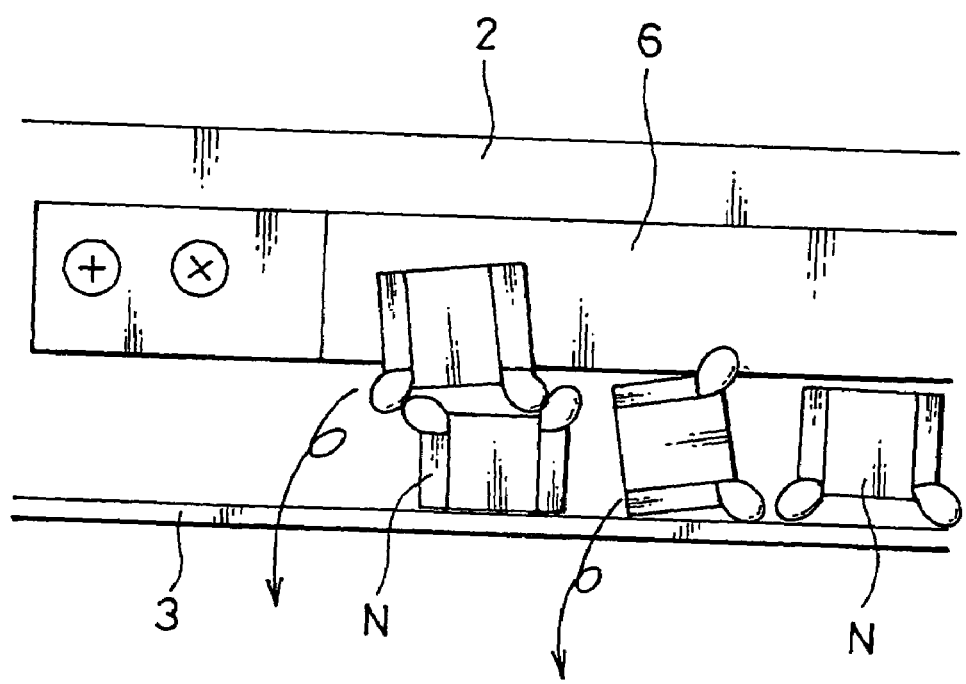
FIG. 12 is a schematic view illustrating an arrangement in which a transporting quantity of the welding nuts is defined by a first wiper.
Figure 13:
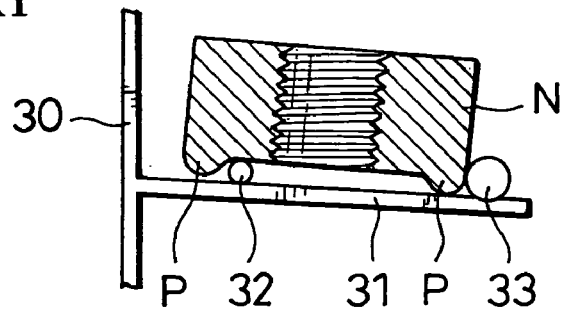
FIG. 13 shows a structure of a transportation track in a prior device and is a schematic cross sectional view illustrating normal positioned welding nuts moving forward along guide rails of two large and small round bars arranged on the track.
Figure 14:
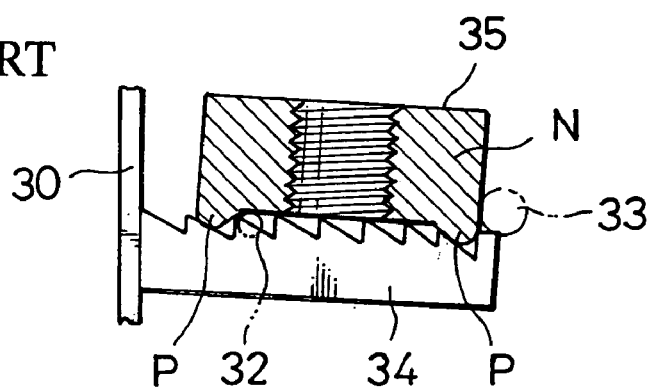
FIG. 14 shows a system for sorting parts in the prior device and is a schematic cross sectional view illustrating an arrangement in which the normal positioned welding nuts transfer from the round bars guide rails to a tooth-shaped track.
Figure 15:
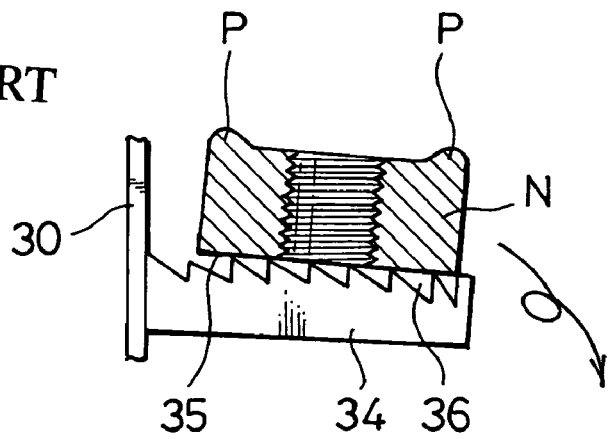
FIG. 15 shows a system for sorting parts in the prior device and is a schematic cross sectional view illustrating an arrangement in which abnormal positioned welding nuts are removed and dropped from the tooth-shaped track.

A first wiper 6 is, as shown in FIGS. 1 and 12, projected inside from the bowl wall 5 above the parts transportation track 3, so that a width of a parts track of the transportation track 3 can be restrained to a specific width against the inside of the vibration bowl 2. Thus, as the welding nuts N pass through the specific width of the parts track, a transportation quantity of the welding nuts N transported at random on the parts transportation track 3 regardless of upward and downward orientations thereof is limited and excess parts are removed, and the welding nuts N can be arranged and transported.

Figure 10:
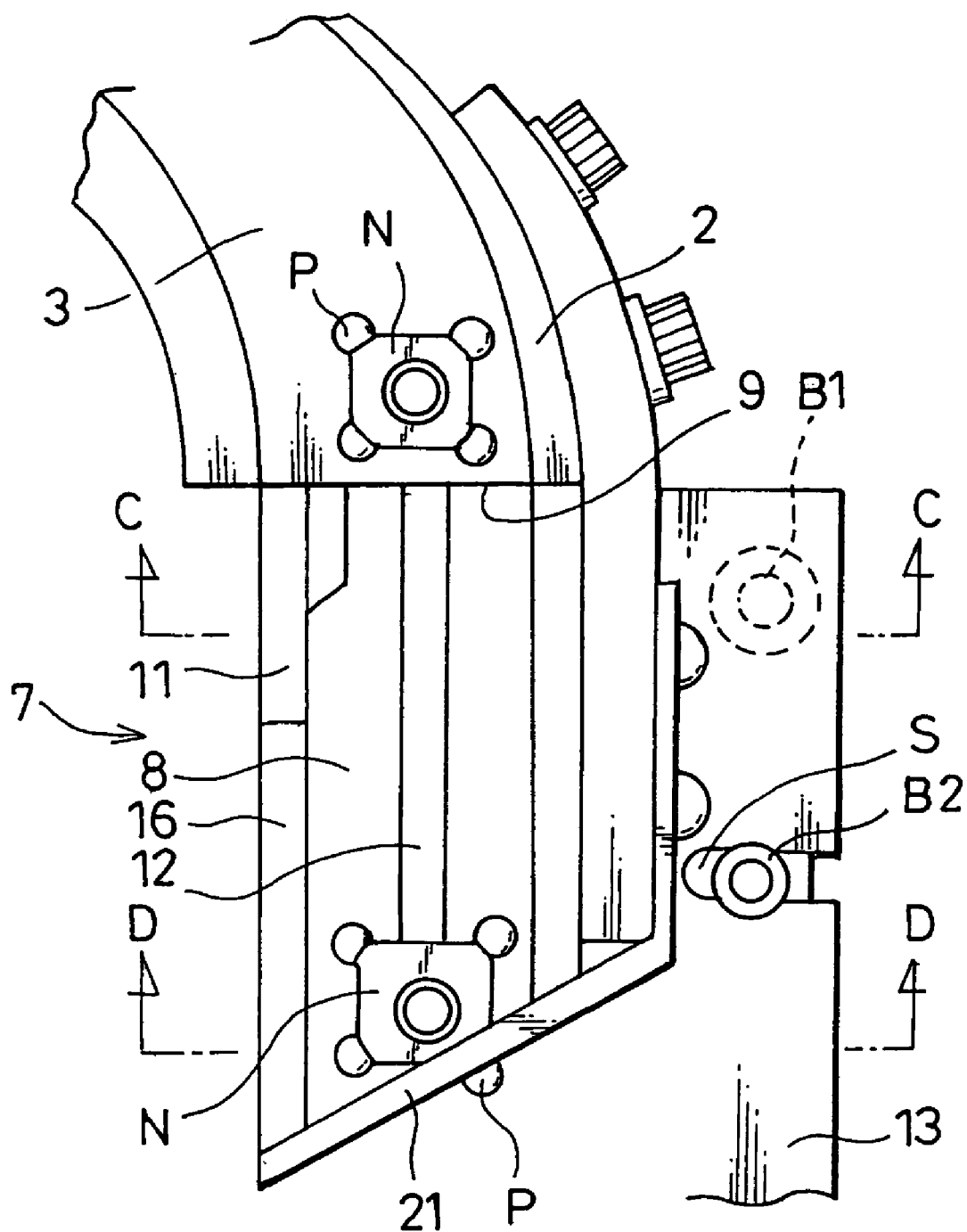
FIG. 10 is a schematic plan view illustrating the welding nuts passing through the sorting unit of the present invention.
Figure 11:
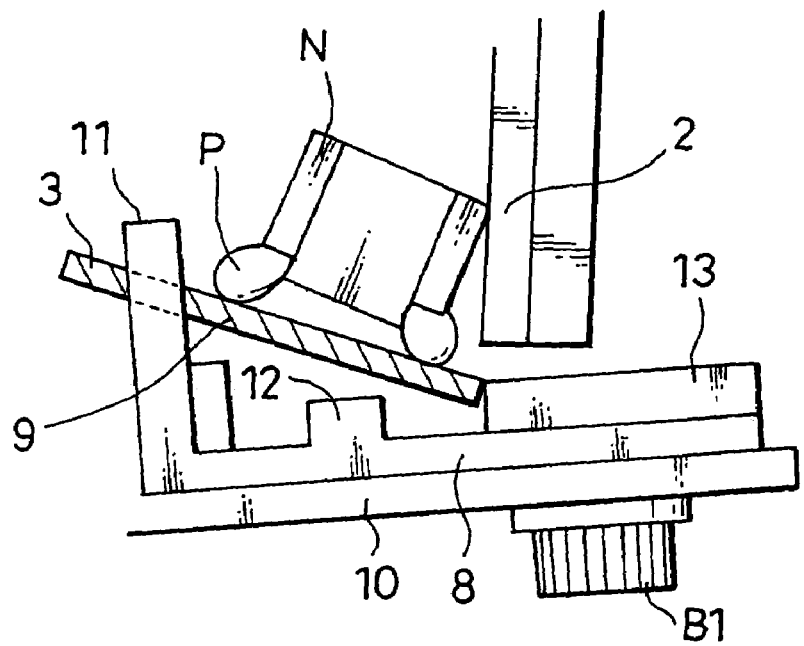
FIG. 11 is a view which is taken in a direction of arrows C—C in FIG. 10.

A sorting unit 7 is shown in FIGS. 2 through 4. A sorting plate 8 of the sorting unit 7 is, as shown in FIGS. 5, 10 and 11, mounted detachably to a fixed supporting plate 10 extending outside of the vibration bowl 2 by a bolt B1 adjacent to a parts outlet at a top end portion 9 of the parts transportation track 3 provided in the vibration bowl 2.

The sorting plate 8 is arranged at a slant so as to make an outside of the parts transportation track (a bowl wall side) continuous with the end portion of the transportation track 3 high, and make an inside (a center side of the bowl) thereof low. A guide (a side plate) 11, which is made higher by about 0.5 mm through 1.0 mm than the height of normal positioned welding nuts N, is provided at an inside edge of the sorting plate 8. A cutout portion 16, for removing improperly-positioned nuts N, is formed by cutting a part of the side plate constituting the guide 11, for instance as shown in FIGS. 2, 6, 7 and 10, as a means for removing only improperly-positioned welding nuts it.

Figure 6:
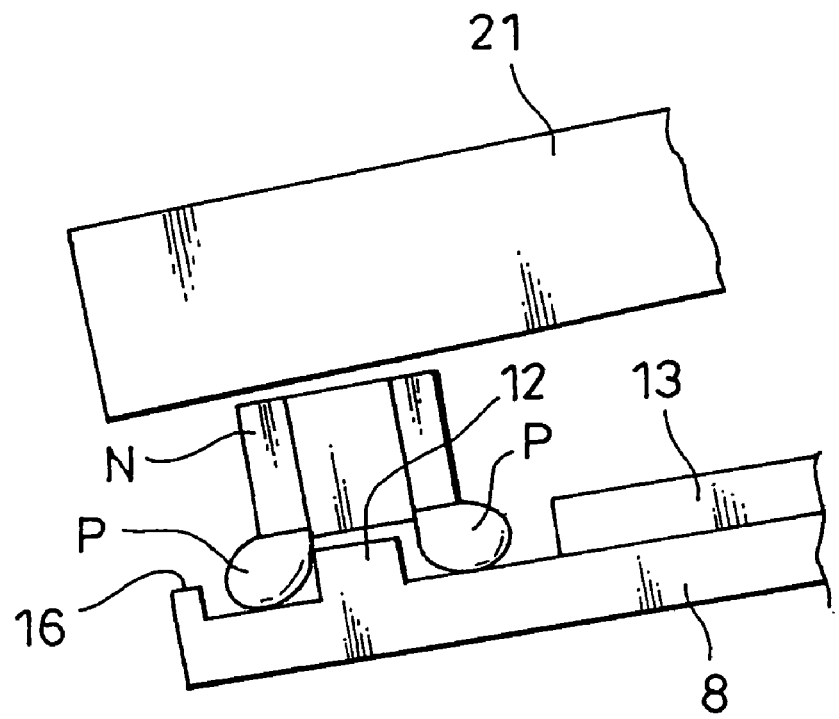
FIG. 6 is a cross sectional view, taken in a direction of arrows D in FIG. 10, illustrating an arrangement in which normal positioned welding nuts passing through the sorting unit of the present invention pass through a second wiper.
Figure 7:
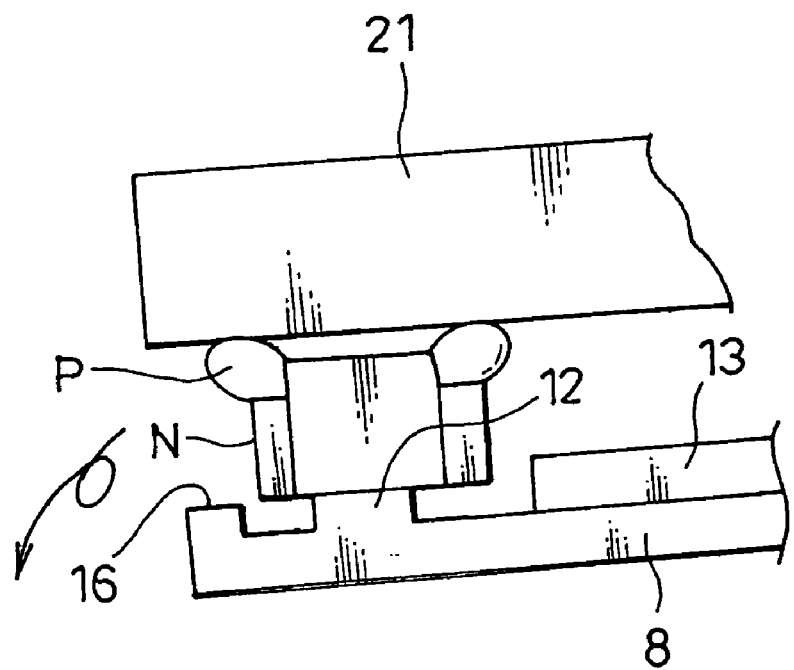
FIG. 7 is a cross sectional view illustrating an arrangement in which abnormal positioned welding nuts passing through the sorting unit of the present invention are blocked by a second wiper.
Figure 8:
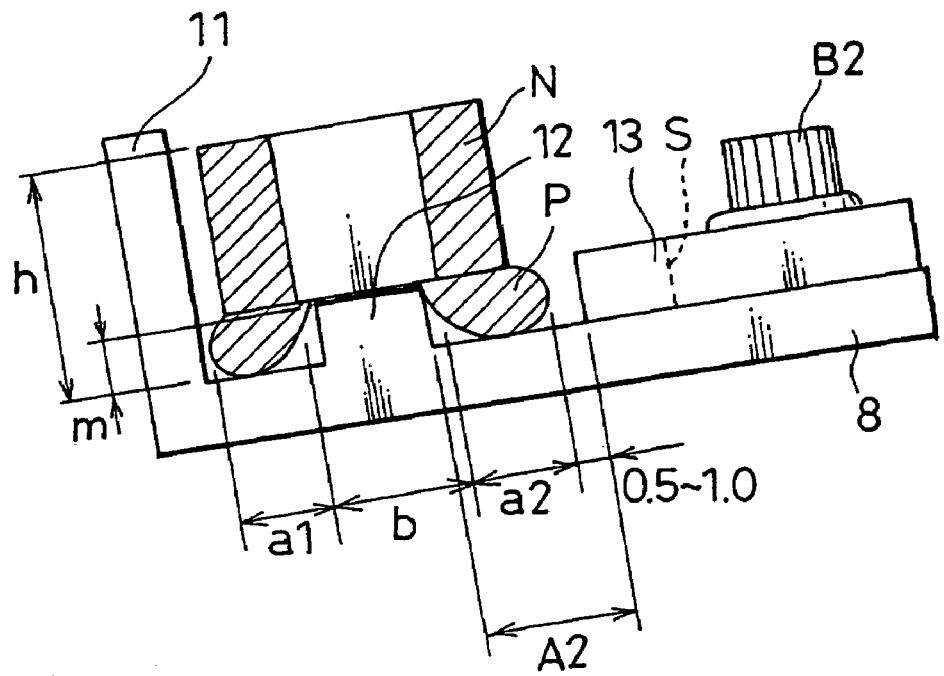
FIG. 8 is a cross sectional view illustrating a structure of a sorting plate including a sorting rail within the sorting unit of the present invention and a relationship between outside dimensions of the welding nuts and a width limitation plate for adjusting the parts track.

A sorting rail 12, whose cross section is convex and which can be straddled by normal-positioned welding nuts with the welding projections positioned at both sides of the sorting rail 12, is formed along the parts track of the sorting plate 8 in a nut advancing direction. The sorting rail 12 is arranged such that normal-positioned welding nuts, with the projections P projecting downwardly, can be guided with the welding projections P on both sides of the sorting rail 12, as shown in FIG. 6. But, in the case of abnormal-positioned welding nuts N whose projections P are positioned upwardly as shown in FIG. 7, the abnormal positioned welding nuts N slip on the sorting rail 12 slanted inwardly and drop into the vibration bowl 2.

Figure 9:
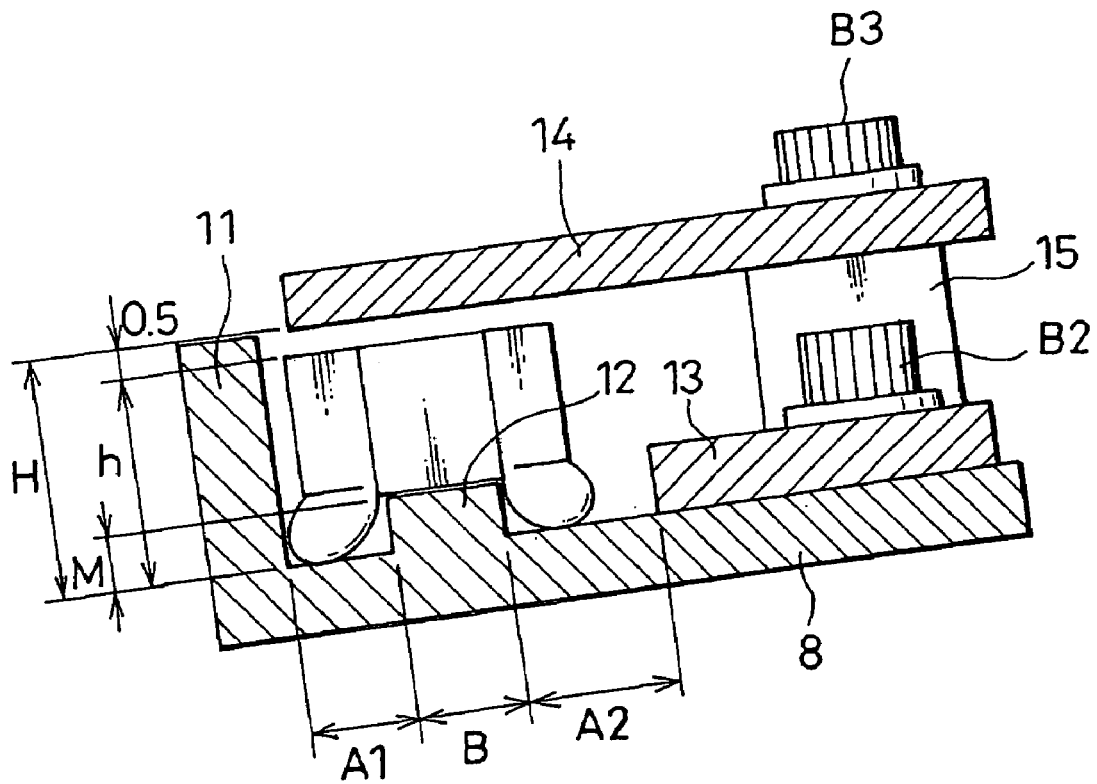
FIG. 9 is a cross sectional view illustrating a structure of the sorting plate including a sorting rail within the sorting unit of the present invention and a relationship between outside dimensions of the welding nuts and a presser plate for adjusting height of the parts track.

As shown in FIG. 9, widths A1 and A2 at both sides of the sorting rail 12, which allow the normal positioned welding nuts to run along the track, are such that an inside track width A1 is fixed, and an outside track width A2, as shown in FIG. 2, is adjusted by a width limitation adjustment plate 13 which can adjusted within a permissible range of an oval-shaped hole S formed in a width direction thereof.

In this case, as shown in FIG. 2, the width limitation adjustment plate 13 is attached to the sorting plate 8 by two bolts B2. The width limitation adjustment plate 13 is mounted on the sorting plate 8 by inserting the bolts B2 into the oval-shaped hole S so that a distance between the width limitation adjustment plate 13 and the sorting rail 12 can be adjusted in a width direction thereof within a range of 0.5 mm through 1.0 mm to accommodate a dimension a2 of the projection P of the welding nut N.

Above the sorting rail 12, as shown in FIGS. 3 and 4, a presser plate 14 is installed by providing collars 15 of a height to allow only the normal-positioned nuts to pass through, and bolts B3.

Accordingly, the number of collars 15 is the same as the number of bolts B3. As shown in FIG. 9, the collars 15 are set to a dimension H higher by 0.5 mm than a height h of the normal-positioned nut, and is installed between the presser plate 14 and the sorting plate 8 by the bolts B3 to adjust a height from the sorting rail 12.

The guide 11 is constituted so as to be a little higher than height h of the normal-positioned nut N, except at the cutout portion 16 for improperly-positioned nut removal that is formed along the track in the parts advancing direction.

The dimensions of the sorting unit 7 correspond to the dimensions of the feeding nuts. That is to say, A1–a1, A2–a2, B–b, H–h and M–m correspond respectively. Note that A1, B and M of the sorting plate 8 are fixed, so that only the sorting plate 8 is adjusted when it does not match the dimensions of the feeding nuts.

As shown in FIGS. 2 through 4, at an end of the parts track of the sorting plate 8 advanced along the guide 11, a transportation pipe sleeve 17 fixed to a support plate 22, is installed at a front of a support plate 23 fixed on the sorting plate 8, by bolts B4. As shown in FIG. 1, a parts feeding tube 18 formed of a material with plasticity and clarity (including a hose or a square tube consisting of a vinyl material or polyurethane rubber material) is connected with the transportation pipe sleeve.

A feeder unit provided in a resistance spot welder (omitted from the figures) is connected with an end of the parts feeding tube 18. As shown in FIG. 1, an air nozzle 19 whose air discharge opening 20 faces toward the parts feeding tube, is installed in the transportation pipe sleeve 17. Compressed air is injected from the air discharge opening 20 of the air nozzle 20. When the air is injected, the normal positioned welding nut N is blown from the transportation pipe sleeve 17 into the parts feeding tube 18 and is transported to the feeder unit installed on the spot welder.

An attached angle of the air discharge opening 20 of the air nozzle 19 is determined so that the discharged compressed air flows smoothly without whirling. The compressed air may be discharged from between the two collars 15 instead of the attached position as mentioned above, or the air discharge opening 20 may be arranged so as to face from the presser plate 14 toward the transportation pipe sleeve 17.

A second wiper 21 shown in FIGS. 6 and 7 causes a width of the parts transportation track 3 to narrow gradually toward the inside of the vibration bowl adjacent to the presser plate 14 at the end portion 9 of the transportation track 3 as shown in FIG. 10, so that the welding nuts N passing near a center of the sorting plate 8 are sorted and arranged in the fixed direction finally before entering a passage under the presser plate 14.

In this case, only the normal positioned welding nuts N whose projections P are downward can pass through the passage under the second wiper 21 as shown in FIG. 6, but the abnormal positioned welding nuts N whose projections P are upward drop from the cutout portion 16 due to being blocked by the second wiper 21.

Then, the normal positioned welding nuts N pass through the cutout portion 16, as shown in FIG. 9, and go under the presser plate 14 to advance along the guide 11 that is higher than the height of the normal positioned nut N. The welding nuts N are advanced in the condition in which they are to be transported to the transportation pipe sleeve 17, as shown in FIG. 1, and flow into the parts feeding tube 18 in a direction indicated by an arrow upon injection of the compressed air from the air discharging opening 20 to be fed to the feeder unit attached to the spot welder.

The welding nuts N are supplied from the feeder unit to a workpiece set on a guide pin of the lower electrode to be welded.

The present invention is to unitize a device for sorting upward and downward welding nuts, and to enable the device to adapt to change of dimensions of the supplied parts in a common bowl by changing or adjusting only the sorting unit 7.

Besides, when a distance A1 between the guide 11, and the sorting rail 12 is not matched to dimensions of the supplied parts, the sorting plate 8 is made so that another kind of sorting plate 8 can be prepared and replaced, so that it is possible to sort irregular parts.

It is considered to sort upward and downward-positioned welding nuts with projections for welding in a resistance welding field, according to an embodiment of the present invention, but a system for changing a sorting unit of the present invention can also be applied to a device for supplying process parts for various assemblies corresponding to size or shape of the supplying parts.

What is claimed is:

1. A vibration type parts feeding method by which welding nuts are put on a parts transportation track arranged spirally along an inner wall of a vibration bowl of a parts feeder to be arranged in turn, and are transported from a parts discharging outlet at a top end of said track to a desired place, comprising:
   detachably installing a sorting unit, for judging normal position or abnormal position of said welding nuts, adjacent to said parts discharging outlet of said bowl, so that said parts feeder can be adapted for use with different sized welding nuts by only changing said sorting unit;
   wherein said sorting unit installed detachably adjacent to said parts discharging outlet of said bowl comprises a sorting plate for guiding said welding nuts along a moving direction, a sorting rail provided along said moving direction in which said welding nuts are advanced, and a width limitation plate for limiting a distance of said parts transportation track between said width limitation plate and said sorting rail; and
   wherein said width limitation plate can move in a direction toward and away from said sorting rail and can be adjusted corresponding to a size of said welding nuts.

2. A vibration type parts feeding method according to claim 1, wherein:
   said sorting unit installed detachably adjacent to said parts discharging outlet of said bowl removes abnormal positioned welding nuts to outside of said parts transportation track, and allows only normal positioned welding nuts to pass through and be transported to said desired place.

3. A vibration type parts feeding device comprising:
   a vibration bowl for housing welding nuts having a plurality of projections for welding;
   a parts transportation track which is arranged spirally along an inner wall of said vibration bowl, on which said welding nuts are to be arranged in turn and along which said welding nuts can rise to be transported to a discharge opening above said bowl continuously by vibration of said bowl;
   a sorting unit for sorting said welding nuts based on whether said welding nuts are in a normal position or an abnormal position, said sorting until being installed detachably adjacent to said parts discharging outlet of said bowl;
   wherein said sorting unit installed detachably adjacent to said parts discharging outlet of said bowl comprises a sorting plate for guiding said welding nuts along a moving direction, a sorting rail provided along said moving direction in which said welding nuts are advanced, and a width limitation plate for limiting a distance of said parts transportation track between said width limitation plate and said sorting rail; and
   wherein said width limitation plate can move in a direction toward and away from said rail and can be adjusted corresponding to a size of said welding nuts.

4. A vibration type parts feeding method by which welding nuts are put on a parts transportation track arranged spirally along an inner wall of a vibration bowl of a parts feeder to be arranged in turn, and are transported from a parts discharging outlet at a top end of said track to a desired place, comprising:
   detachably installing a sorting unit, for judging normal position or abnormal position of said welding nuts, adjacent to said parts discharging outlet of said bowl, so that said parts feeder can be adapted for use with different sized welding nuts by only changing said sorting unit;
   wherein said sorting unit installed detachably adjacent to said parts discharging outlet of said bowl comprises a sorting plate for guiding said welding nuts, a sorting rail which is provided along said sorting plate and over which projections positioned at both sides of a normal positioned welding nut can straddle, and a presser plate which is arranged at a height such that only normal positioned welding nuts are allowed to pass along said sorting rail; and
   wherein a height of said presser plate from said sorting rail can be adjusted corresponding to a size of said welding nuts.

5. A vibration type parts feeding method according to claim 4, wherein:
   said sorting unit further comprises a width limitation plate that can move in a direction toward and away from said rail to be adjusted corresponding to a size of said welding nuts for limiting a distance of said parts transportation track between said width limitation plate and said sorting rail.

6. A vibration type parts feeding device comprising:
   a vibration bowl for housing welding nuts having a plurality of projections for welding;
   a parts transportation track which is arranged spirally along an inner wall of said vibration bowl, on which said welding nuts are to be arranged in turn and along which said welding nuts can rise to be transported to a discharge opening above said bowl continuously by vibration of said bowl;
   a sorting unit for sorting said welding nuts based on whether said welding nuts are in a normal position or an abnormal position, said sorting until being installed detachably adjacent to said parts discharging outlet of said bowl;
   wherein said sorting unit installed detachably adjacent to said parts discharging outlet of said bowl comprises a sorting plate for guiding said welding nuts, a sorting rail which is provided along said sorting plate and over which projections positioned at both sides of said normal positioned welding nut can straddle, and a presser plate which is arranged at a height such that only normal positioned welding nuts are allowed to pass along said sorting rail; and wherein a height of said presser plate from said sorting rail can be adjusted corresponding to a size of said welding nuts.

7. A vibration type parts feeding device according to claim 6, wherein:

said sorting unit further comprises a width limitation plate that can move in a direction toward and away from said sorting rail and can be adjusted corresponding to a size of said welding nuts, for limiting a distance of said parts transportation track between said width limitation plate and said sorting rail.

8. A vibration type parts feeding device according to claim 6, wherein:

said sorting plate of said sorting unit includes a removing portion in at least one part of said parts transportation track so as to drop abnormal positioned welding nuts outside the parts transportation track by being slanted toward an inside of said bowl.

\* \* \* \* \*